(12) United States Patent
Wang

(10) Patent No.: US 10,645,021 B2
(45) Date of Patent: May 5, 2020

(54) RESOURCE PROCESSING METHOD AND APPARATUS

(71) Applicant: Alibaba Group Holding Limited, George Town (KY)

(72) Inventor: Yuzhong Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/124,580

(22) Filed: Sep. 7, 2018

(65) Prior Publication Data

US 2019/0081906 A1    Mar. 14, 2019

(30) Foreign Application Priority Data

Sep. 8, 2017  (CN) .......................... 2017 1 0806097

(51) Int. Cl.
| | |
|---|---|
| *H04L 12/911* | (2013.01) |
| *G06Q 40/06* | (2012.01) |
| *G06Q 30/02* | (2012.01) |
| *G06Q 40/02* | (2012.01) |

(Continued)

(52) U.S. Cl.
CPC ............ *H04L 47/70* (2013.01); *G06F 9/5011* (2013.01); *G06Q 30/02* (2013.01); *G06Q 30/0201* (2013.01); *G06Q 30/0207* (2013.01); *G06Q 40/025* (2013.01); *G06Q 40/06* (2013.01); *H04L 67/16* (2013.01)

(58) Field of Classification Search
CPC ........ H04L 47/70; H04L 67/16; G06F 9/5011; G06Q 30/02; G06Q 30/0201; G06Q 30/0207; G06Q 40/025; G06Q 40/06

USPC ......................................................... 709/226
See application file for complete search history.

(56) References Cited

U.S. PATENT DOCUMENTS

| | | |
|---|---|---|
| 5,689,659 A | 11/1997 | Tietjen et al. |
| 6,345,261 B1 * | 2/2002 | Feidelson ............ G06Q 20/387 705/14.18 |
| 6,782,427 B1 | 8/2004 | Van Andel et al. |

(Continued)

FOREIGN PATENT DOCUMENTS

| | | |
|---|---|---|
| CN | 103186867 | 7/2013 |
| TW | 200926031 | 6/2009 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — James E Springer
(74) *Attorney, Agent, or Firm* — Fish & Richardson P.C.

(57) ABSTRACT

Techniques for providing a resource processing method and apparatus are described. One example method includes first resource data of a user is obtained from a first service platform. Second resource data of the user is obtained from a second service platform. Incremental processing data is generated based on at least the second resource data using the first resource data. A first transfer request is transmitted including the generated incremental processing data and an indication to a second service provider to instruct the second service provider to transfer a resource matching a value of the generated incremental processing data to a resource pool.

23 Claims, 9 Drawing Sheets

(51) Int. Cl.
*G06F 9/50* (2006.01)
*H04L 29/08* (2006.01)

(56) References Cited

U.S. PATENT DOCUMENTS

| | | | |
|---|---|---|---|
| 7,509,465 B1 | 3/2009 | Misra et al. | |
| 8,313,023 B1 | 11/2012 | McGhie et al. | |
| 8,407,087 B2 | 3/2013 | Postrel | |
| 8,944,320 B1 | 2/2015 | McGhie et al. | |
| 2004/0054612 A1* | 3/2004 | Ocampo | G06Q 40/00 705/36 R |
| 2007/0067208 A1 | 3/2007 | Haggerty et al. | |
| 2008/0162377 A1* | 7/2008 | Pinkas | G06Q 40/04 705/36 R |
| 2011/0087532 A1* | 4/2011 | Garner | G06Q 30/00 705/14.18 |
| 2012/0203608 A1 | 8/2012 | Lele et al. | |
| 2013/0332388 A1* | 12/2013 | Martell | G06Q 40/06 705/36 R |
| 2014/0095258 A1* | 4/2014 | Weiss | G06Q 30/0211 705/7.32 |
| 2014/0188763 A1* | 7/2014 | Willis | G06Q 40/06 705/36 R |
| 2015/0332401 A1* | 11/2015 | Porter | G06Q 40/06 705/36 R |
| 2016/0098739 A1 | 4/2016 | Bowman | |
| 2016/0379306 A1* | 12/2016 | Slotterback | G06Q 40/06 705/36 R |
| 2017/0041454 A1* | 2/2017 | Nicholls | H04L 67/16 |
| 2017/0061461 A1* | 3/2017 | Jajara | G06Q 30/0222 |
| 2017/0140411 A1* | 5/2017 | Lele | G06Q 30/0216 |

FOREIGN PATENT DOCUMENTS

| | | |
|---|---|---|
| TW | M486109 | 9/2014 |
| TW | 201530466 | 8/2015 |

OTHER PUBLICATIONS

Nakamoto, "Bitcoin: A Peer-to-Peer Electronic Cash System," www.bitcoin.org, 2005, 9 pages.
International Search Report and Written Opinion in International Application No. PCT/US2018/049957, dated Dec. 13, 2018, 12 pages.
PCT International Preliminary Report on Patentability in International Application No. PCT/US2018/049957, dated Mar. 10, 2020, 8 pages.

* cited by examiner

RESOURCE PROCESSING METHOD AND APPARATUS

CROSS REFERENCE TO RELATED APPLICATION

This application claims priority to Chinese Patent Application No. 201710806097.9, filed on Sep. 8, 2017, which is hereby incorporated by reference in its entirety.

TECHNICAL FIELD

The present disclosure relates to the field of Internet technologies, and in particular, to a resource processing method and apparatus.

BACKGROUND

With the development of Internet technologies and social economy, people's income is gradually increasing, and they use services provided by a service platform more frequently. One user can use services provided by different service platforms. Each service platform can include a plurality of service providers. In addition, to encourage users to use services provided by some service platforms more frequently, the service platforms offer corresponding discounts to the users based on data generated by the users when using the services provided by the service platforms.

A user generates a plurality of pieces of data accordingly when using services provided by a plurality of service platforms. However, there is no association among the data. Currently, data generated by a user when using a service provided by one service platform cannot be used to process another service platform's data which is generated by the same user. For example, spending data generated by the user when shopping on a shopping platform cannot be used to increase income generated by a wealth investment product purchased by the user from a wealth investment platform.

SUMMARY

The present disclosure provides a resource processing method and apparatus, so that resource data is obtained from a service platform, and the resource data is processed, thereby implementing resource transfer.

According to a first aspect, the present disclosure provides a resource processing method, and the method includes: obtaining a user's first resource data from a first service platform, and obtaining the user's second resource data from a second service platform, where the first resource data is generated by the user by using a first service, provided by a first service provider on the first service platform, and the second resource data is generated by the user by using a second service, provided by a second service provider on the second service platform; performing incremental processing on the first resource data based on at least the second resource data to determine transferred incremental data of the first resource data; and sending a first transfer request including the transferred incremental data to the second service provider, so that the second service provider transfers a resource matching the transferred incremental data to a resource pool based on the transferred incremental data.

According to a second aspect, the present disclosure provides a service platform resource processing method, and the method includes: receiving a user's transferred incremental data sent by a processing platform, where the transferred incremental data is determined by the processing platform based on resource data of the user on another service platform; obtaining a resource matching the transferred incremental data from a resource pool based on the transferred incremental data, where the resource is transferred by the other service platform to the resource pool based on the transferred incremental data; and transferring the resource to the user.

According to a third aspect, the present disclosure provides a resource processing apparatus, and the apparatus includes: a first acquisition unit, configured to: obtain a user's first resource data from a first service platform, and obtain the user's second resource data from a second service platform, where the first resource data is generated by the user by using a first service, provided by a first service provider on the first service platform, and the second resource data is generated by the user by using a second service, provided by a second service provider on the second service platform; a first processing unit, configured to perform incremental processing on the first resource data based on at least the second resource data to determine transferred incremental data of the first resource data; and a first sending unit, configured to send a first transfer request including the transferred incremental data to the second service provider, so that the second service provider transfers a resource matching the transferred incremental data to a resource pool based on the transferred incremental data.

According to a fourth aspect, the present disclosure provides a service platform resource processing apparatus, and the apparatus includes: a receiving unit, configured to receive a user's transferred incremental data sent by a processing platform, where the transferred incremental data is determined by the processing platform based on resource data of the user on another service platform; an acquisition unit, configured to obtain a resource matching the transferred incremental data from a resource pool based on the transferred incremental data, where the resource is transferred by the another service platform to the resource pool based on the transferred incremental data; and a transfer unit, configured to transfer the resource to the user.

According to a fifth aspect, the present disclosure provides a wealth investment income processing method, and the method includes: obtaining wealth investment data of a user from a wealth investment platform, and obtaining spending data of the user from a spending platform, where the wealth investment data is generated by the user by purchasing a wealth investment product, provided by a releasing agency on the wealth investment platform, and the spending data is generated by the user by purchasing merchandise, provided by a merchant on the spending platform; performing income processing on the wealth investment data based on at least the spending data to determine transferred income data of the wealth investment data; and sending a first transfer request including the transferred income data to the merchant, so that the merchant transfers a fund matching the transferred income data to a fund pool based on the transferred income data.

According to a sixth aspect, the present disclosure provides a wealth investment income processing apparatus, and the apparatus includes: a first acquisition unit, configured to: obtain wealth investment data of a user from a wealth investment platform, and obtain spending data of the user from a spending platform, where the wealth investment data is generated by the user by purchasing a wealth investment product provided by a releasing agency on the wealth investment platform, and the spending data is generated by the user by purchasing merchandise provided by a merchant on the spending platform; a first processing unit, configured to perform income processing on the wealth investment data based on at least the spending data to determine transferred income data of the wealth investment data; and a first sending unit, configured to send a first transfer request including the transferred income data to the merchant, so that the merchant transfers a fund matching the transferred income data to a fund pool based on the transferred income data.

In the resource processing method and apparatus provided in the present disclosure, incremental processing is performed on the first resource data on the first service platform by using the second resource data on the second service platform to determine the transferred incremental data, so that the second service provider transfers the resource matching the transferred incremental data to the resource pool based on the transferred incremental data, and the first service platform transfers the resource to the user. This method can increase income of wealth investment data based on spending data of the user, so that the user can obtain additional wealth investment income.

BRIEF DESCRIPTION OF DRAWINGS

To describe the technical solutions in the implementations of the present disclosure more clearly, the following briefly introduces the accompanying drawings needed for describing the implementations. Apparently, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes implementations of the present disclosure with reference to accompanying drawings.

Figure 1:
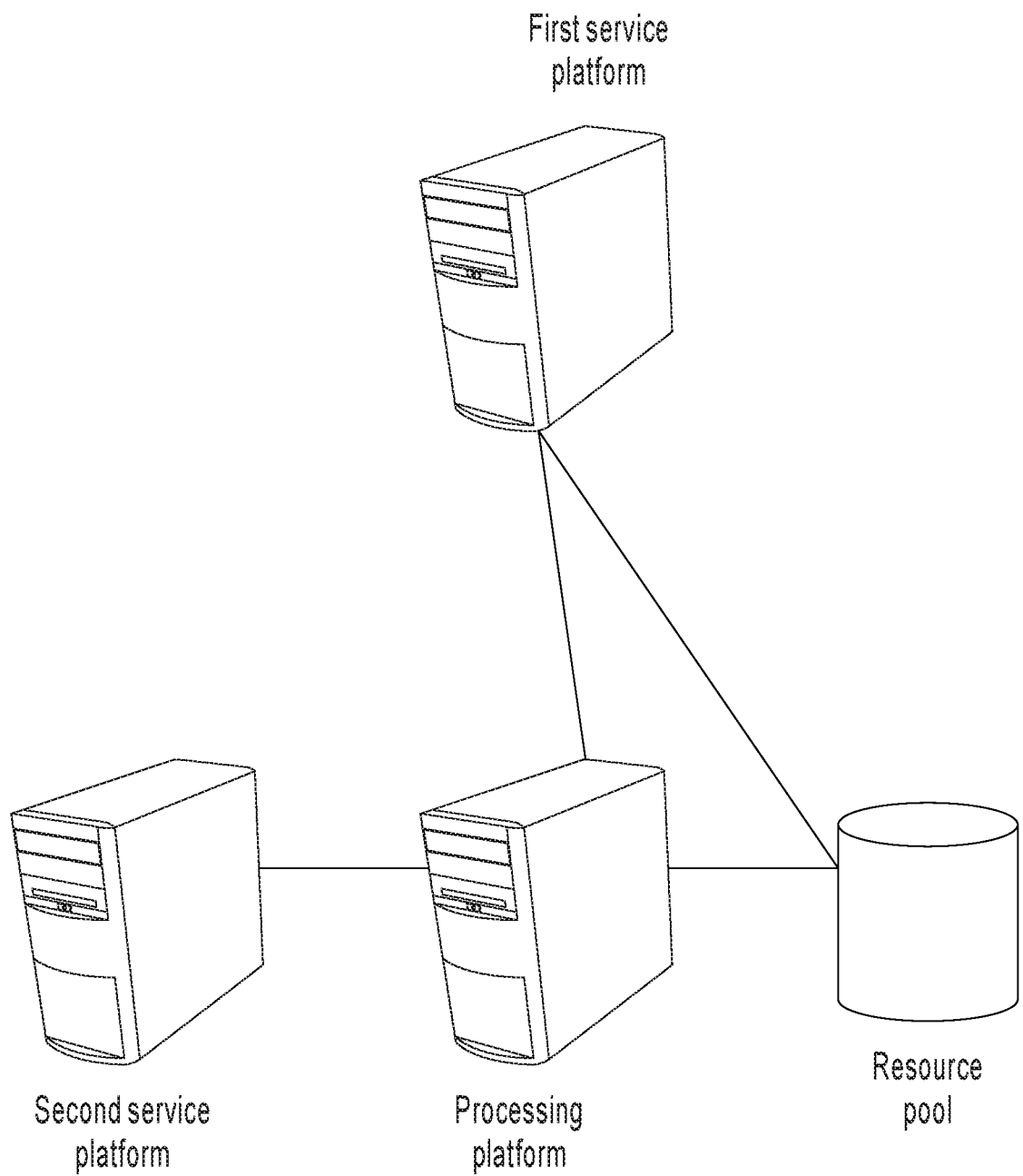
FIG. 1 is a schematic diagram illustrating an application scenario of a resource processing method, according to an implementation of the present disclosure.

FIG. 1 is a schematic diagram illustrating an application scenario of a resource processing method, according to an implementation of the present disclosure. The processing method can be performed by a processing platform. In FIG. 1, the processing platform obtains first resource data from a first service platform, and obtains second resource data from a second service platform. The first resource data is generated by a user by using a first service, provided by a first service provider, and the second resource data is generated by the user by using a second service, provided by a second service provider. The processing platform performs incremental processing on the user's first resource data based on the obtained the user's second resource data, to determine transferred incremental data of the first resource data, and sends the transferred incremental data to the first service platform. The first service platform can obtain a resource matching the transferred incremental data from a resource pool, and transfers the resource to the user. The resource is transferred by the second service provider to the resource pool based on the transferred incremental data.

It is worthwhile to note that the processing platform can obtain data online or offline. Online obtaining means that the processing platform receives real-time message that carries data, and then processes the data in real time after obtaining the data from the message. For example, the processing platform receives the first service platform's first message that includes the first resource data; receives the second service platform's second message that includes the second source data, and performs incremental processing on the first resource data in real time based on the second resource data.

Offline obtaining means that the processing platform synchronizes data on a service platform regularly, and processes synchronized data offline after obtaining the data. For example, the processing platform synchronizes the data on the service platform at 6:00 am every day. The data on the service platform includes the first resource data on the first service platform and the second resource data on the second service platform. When data is processed offline, stability of online system and resource processing apparatus can be ensured, data processing complexity can be reduced, and reliability of a data processing result can be ensured.

In the resource processing method provided in this implementation of the present disclosure, incremental processing is performed on the first resource data on the first service platform by using the second resource data on the second service platform to determine the transferred incremental data, so that the second service provider can transfer the resource matching the transferred incremental data to the resource pool based on the transferred incremental data. Then, the first service platform can obtain the resource matching the transferred incremental data from the resource pool, and transfer the resource to the user. This method can increase income of wealth investment data based on spending data of the user, so that the user can obtain additional wealth investment income.

Figure 2:
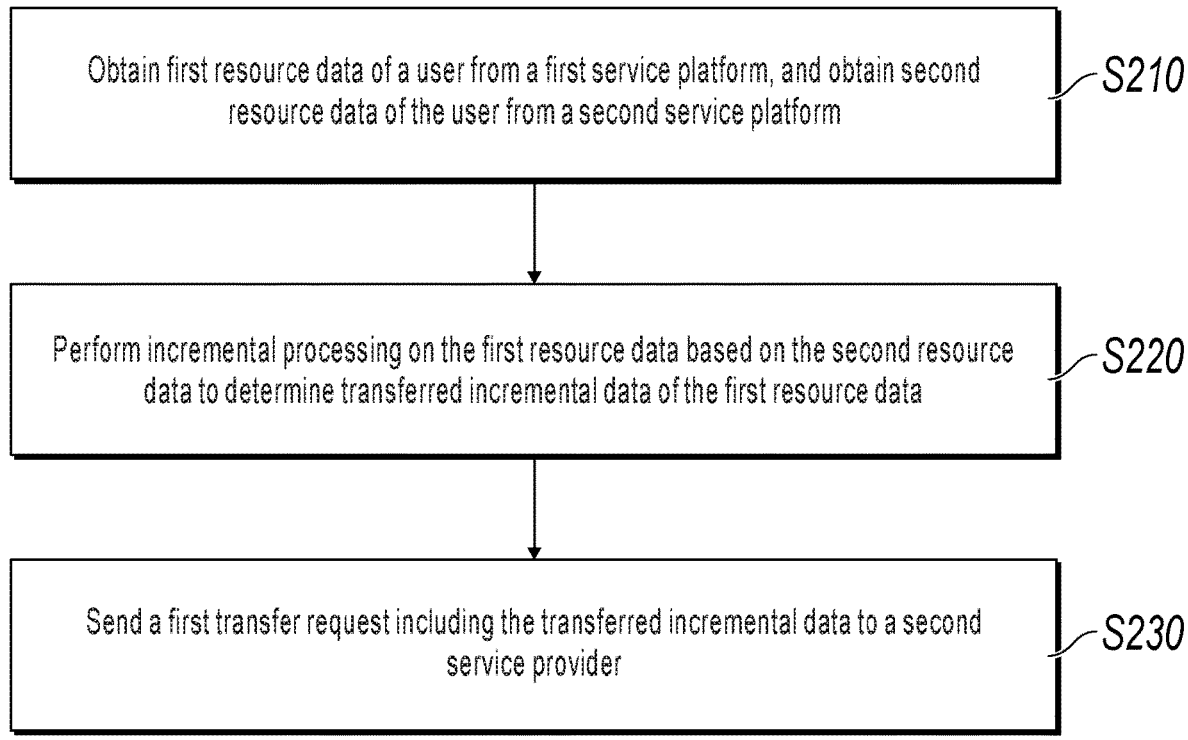
FIG. 2 is a flowchart illustrating a resource processing method, according to an implementation of the present disclosure.

FIG. 2 is a flowchart illustrating a resource processing method, according to an implementation of the present disclosure. The method can be performed by a device having a processing capability, such as a server, a system, an apparatus, or a software platform. For example, the method can be performed by the processing platform in FIG. 1. As shown in FIG. 2, the method includes the following steps.

Step S210: Obtain a user's first resource data from a first service platform, and obtain the user's the user's second resource data from a second service platform.

In the present step, the first resource data is generated by the user by using a first service, provided by a first service provider on the first service platform, and the second resource data is generated by the user by using a second service, provided by a second service provider on the second service platform. The first resource data can include the first service and a first resource share that corresponds to the first service. The second resource data can include the second service and a second resource share that corresponds to the second service.

For example, as shown in Table 1 and Table 2, data in Table 1 includes first resource data generated by the user by using the first service three times. First resource shares included in the data are 300, 500, and 1000, and respectively correspond to a first service A, a first service B, and a first service C. Names of all or some of the three first services can be the same or different from each other. Data in Table 2 includes second resource data generated by the user by using the second service twice. Second resource shares included in the data are 700 and 1800, and respectively correspond to a second service 001 and a second service 002.

TABLE 1

| First service | First resource share |
|---|---|
| A | 300 |
| B | 500 |
| C | 1000 |

TABLE 2

| Second service | Second resource share |
|---|---|
| 001 | 700 |
| 002 | 1800 |

Step S220: Perform incremental processing on the first resource data based on the second resource data to obtain transferred incremental data of the first resource data.

The processing platform obtains maximum appreciation data that corresponds to the first resource data based on the first resource data, and obtains maximum return data that corresponds to the second resource data based on the second resource data. Then, the processing platform performs incremental processing on the first resource data based on the maximum appreciation data and the maximum return data, to determine the transferred incremental data of the first resource data.

The maximum appreciation data includes the first service and a maximum appreciation share that corresponds to the first service. The maximum return data includes the second service and a maximum return share that corresponds to the second service. The transferred incremental data includes the first service, the second service, and a transferred incremental share.

The performing incremental processing on the first resource data based on the maximum appreciation data and the maximum return data to determine the transferred incremental data of the first resource data can include: the processing platform determines whether the maximum return share is greater than the maximum appreciation share; if the maximum return share is not greater than the maximum appreciation share, use the maximum return share as the transferred incremental share; if the maximum return share is greater than the maximum appreciation share, use the maximum appreciation share as the transferred incremental share, obtains a difference between the maximum return share and the maximum appreciation share, and uses the difference as a reserved share. A share is transferred from the reserved share when the user returns the second service.

For example, as shown in Table 3 and Table 4, Table 3 includes the maximum appreciation data obtained by the processing platform based on the first resource data in Table 1. The maximum appreciation data includes the first service A, the first service B, and the first service C and corresponding maximum appreciation shares 3, 5, and 10. Table 4 includes the maximum return data obtained by the processing platform based on the second resource data in Table 2. The maximum return data includes the second service 001 and the second service 002 and corresponding maximum return shares 7 and 18.

TABLE 3

| First service | Maximum appreciation share |
|---|---|
| A | 3 |
| B | 5 |
| C | 10 |

TABLE 4

| Second service | Maximum return share |
|---|---|
| 001 | 7 |
| 002 | 18 |

That the processing platform performs incremental processing on the first resource data in Table 1 based on the maximum appreciation data in Table 3 and the maximum return data in Table 4 to determine the transferred incremental data of the first resource data can include: the processing platform determines that the maximum appreciation share 3 of the first service A is not greater than the maximum return share 7 of the second service 001, deducts a share 3 the same as the maximum appreciation share from the maximum return share of the second service 001, and uses the share as a transferred incremental share of the first service A. In this case, the transferred incremental share of the first service A has reached the maximum appreciation share 3 of the first service A.

Then, the processing platform determines that the maximum appreciation share 5 of the first service B is greater than the remaining return share 4 of the second service 001, and uses a share that is the same as the remaining return share as a transferred incremental share of the first service B. In this case, the entire maximum return share of the second service 001 is transferred. Correspondingly, a remaining appreciation share in the maximum appreciation share of the first service B is 1.

The processing platform determines that the remaining appreciation share 1 of the first service B is not greater than the maximum return share 18 of the second service 002, transfers a share 1 the same as the remaining appreciation share of the first service B from the maximum return share of the second service 002, and uses the share as the transferred incremental share of the first service B. In this case, the transferred incremental share of the first service B has been accumulated and reached the maximum appreciation share 5 of the first service B. Correspondingly, a remaining return share in the maximum return share of the second service 002 is 17.

The processing platform determines that the maximum appreciation share 10 of the first service C is not greater than the remaining return share 17 in the maximum return share of the second service 002, deducts a share 10 the same as the maximum appreciation share of the first service C from the remaining return share of the second service 002, and uses the share as a transferred incremental share of the first service C. In this case, the transferred incremental share of the first service C has reached the maximum appreciation share 10 of the first service C. Correspondingly, the remaining return share in the maximum return share of the second service 002 changes to 7.

Finally, the processing platform uses the remaining return share 7 in the maximum return share of the second service 002 as a reserved share, and a share is transferred from the reserved share when the user returns the second service.

The transferred incremental data determined by the processing platform includes data in Table 5, and further includes the reserved share 7.

TABLE 5

| First service | Maximum appreciation share | Second service | Maximum return share | Incremental share |
|---|---|---|---|---|
| A | 3 | 001 | 7 | 3 |
| B | 5 | 001 | 7 | 4 |
| B | 5 | 002 | 18 | 1 |
| C | 10 | 002 | 18 | 10 |

Step S230: Send a first transfer request including the transferred incremental data to a second service provider, so that the second service provider transfers a resource matching the transferred incremental data to a resource pool based on the transferred incremental data.

In an implementation, the transferred incremental data is further sent to the first service platform, so that the first service platform obtains the resource matching the transferred incremental data from the resource pool, and transfers the resource to the user.

The processing platform sends the transferred incremental data to the first service platform, so that the first service platform obtains the resource matching the transferred incremental data from the resource pool, and transfers the resource to the user. The resource is transferred in step 230 by the second service provider to the resource pool based on the first transfer request which includes the transferred incremental data.

Optionally, before step S220, the method can further include: the processing platform obtains an appreciation rate of each first service used by the user and a first resource share that corresponds to each first service, and obtains a return rate of each second service used by the user and a second resource share that corresponds to each second service. Then, the processing platform calculates a maximum appreciation share of the first resource data based on the obtained first resource share and the appreciation rate, and calculates a maximum return share of the second resource data based on the second resource share and the return rate.

For example, the processing platform obtains an appreciation rate 1% of the first service A used by the user and a first resource share 300 of the service, and obtains a return rate 1% of the second service 001 used by the user and a second resource share 700 of the service. In this case, the processing platform can obtain the maximum appreciation share 3 of the first resource share and the maximum return share 7 of the second resource share.

The processing platform can store a predetermined appreciation rate of each first service and a predetermined return rate of each second service. For example, the processing platform sets the return rate of the second service stepwise based on the second resource share in the second resource data. For example, when the second resource share is not greater than 1000, the return rate of the share is 1%; or when the second resource share exceeds 1000, the return rate of the share that exceeds 1000 is 1.5%.

In the resource processing method provided in this implementation of the present disclosure, incremental processing is performed on the first resource data on the first service platform by using the second resource data on the second service platform to determine the transferred incremental data, so that the second service provider transfers the resource matching the transferred incremental data to the resource pool based on the transferred incremental data, and the first service platform transfers the resource to the user. This method can increase income of wealth investment data based on spending data of the user, so that the user can obtain additional wealth investment income.

Figure 3A:
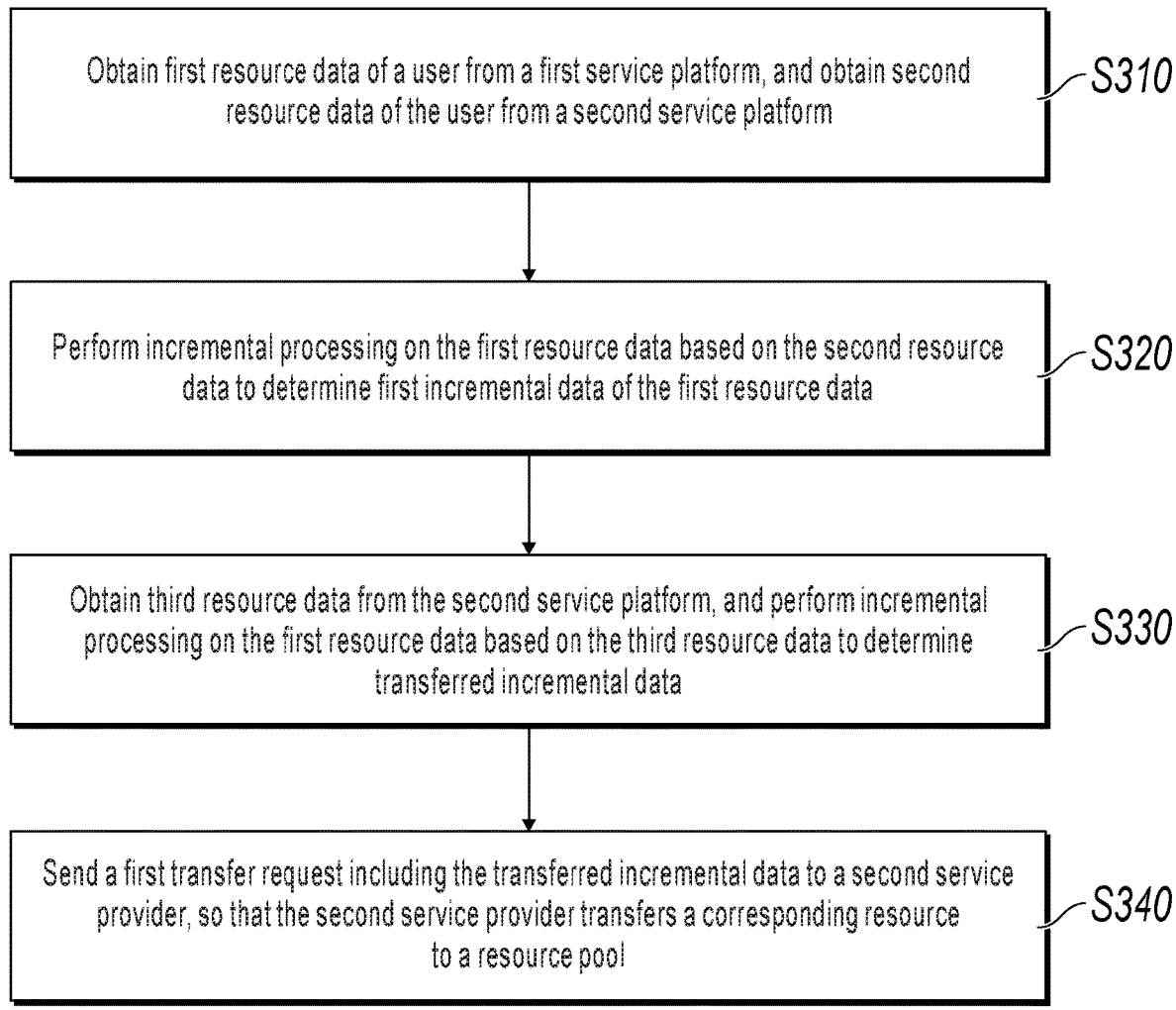
FIG. 3A is a flowchart illustrating another resource processing method, according to an implementation of the present disclosure.

FIG. 3A is a flowchart illustrating another resource processing method, according to an implementation of the present disclosure. In the method, a processing platform can obtain third resource data of a user. The third resource data is generated by returning some or all of the second service before the user confirms the second service.

The method can be performed by a device having a processing capability, such as a server, a system, an apparatus, or a software platform. For example, the method can be performed by the processing platform in FIG. 1. As shown in FIG. 3, the method includes the following steps.

Step S310: Obtain a user's first resource data from a first service platform, and obtain the user's second resource data from a second service platform.

It is worthwhile to note that, for descriptions of step S310, refer to the descriptions of step S210 in the earlier-described implementation of the present disclosure. Details are not described here again.

Step S320: Perform incremental processing on the first resource data based on the second resource data to determine first incremental data of the first resource data.

The first incremental data includes a first incremental share and a reserved share.

It is worthwhile to note that, for descriptions of step S320, refer to the descriptions of step S220 in the earlier-described implementation of the present disclosure. Details are not described here again.

Step S330: The processing platform obtains third resource data from the second service platform, performs incremental processing on the first resource data based on the third resource data to obtain second incremental data of the first resource data, and uses the difference between the first incremental data and the second incremental data as transferred incremental data.

The processing platform obtains the third resource data from the second service platform, and obtains a first maximum impairment share that corresponds to the third resource data based on the third resource data, and determines whether the first maximum impairment share is greater than the reserved share. If the first maximum impairment share is not greater than the reserved share, the processing platform deducts a share the same as the first maximum impairment share from the reserved share, and uses the difference between the reserved share and the first maximum impairment share as an updated reserved share; or if the first maximum impairment share is greater than the reserved share, the processing platform deducts the reserved share, transfers the difference between the first maximum impairment share and the reserved share from the first incremental share, and uses the difference between the first incremental share and the difference as a share of the second incremental data.

The processing platform obtains a first maximum impairment share that corresponds to the third resource data based on the third resource data can include: the processing platform determines, based on a share in the third resource data, a maximum return share that is the same as the share and that corresponds to a second resource share, and uses a share the same as the maximum return share as the first maximum impairment share that corresponds to the third resource data.

For example, if the processing platform determines that the first maximum impairment share is greater than the reserved share, the processing platform deducts the reserved share, transfers a difference between the first maximum impairment share and the reserved share from the first incremental share, and uses a difference between the first incremental share and the difference as a share of the second incremental data. The first resource data can include a plurality of first services and a plurality of first resource shares that correspond to the first services. The second resource data can include a plurality of second services and a plurality of second service shares that correspond to the second services. Incremental processing can be successively performed on the plurality of first resource shares by using one of the plurality of second service shares in a sequence of generating the plurality of first resource shares, and first incremental shares that correspond to the plurality of first resource shares are obtained. In this case, the processing platform deducts a difference between the reserved share and a first maximum impairment share of a second service from the first incremental share in reverse order. To be specific, the plurality of first incremental shares that correspond to the plurality of first resource shares are successively transferred in a sequence opposite to the sequence of separately performing incremental processing on the plurality of first resource shares by using the second service shares.

For example, the processing platform obtains the third resource data from the second service platform. As shown in Table 6, a second service 002 and a second service 001 are successively returned. The second service 002 and the second service 001 respectively correspond to a second resource share 1000 and a second resource share 500.

TABLE 6

| Second service | Second resource share |
|---|---|
| 002 | 1000 |
| 001 | 500 |

The processing platform obtains a maximum impairment share that corresponds to the second revocation share. The maximum impairment share includes a maximum impairment share 10 that corresponds to the second revocation share of the second service 002 and a maximum impairment share 5 that corresponds to the second revocation share of the second service 001.

The first incremental data is shown in Table 5, and the reserved share included in the first incremental data is 7. If the processing platform determines that the maximum impairment share 10 of the second service 002 is greater than the reserved share 7, the processing platform deducts the entire reserved share 7. Correspondingly, a remaining impairment share in the maximum impairment share of the second service 002 is 3.

However, if the processing platform determines that the remaining impairment share 3 of the second service 002 is not greater than a first incremental share 10 obtained by performing incremental processing on a first service C by using the second resource share that corresponds to the second service 002, the processing platform deducts a share the same as the remaining impairment share 3 in the maximum impairment share of the second service 002 from the incremental share.

If the processing platform determines that the maximum impairment share 5 of the second service 001 is greater than a first incremental share 4 obtained by performing incremental processing on a first service B by using the second resource share that corresponds to the second service 001, the processing platform deducts the entire first incremental share 4. Correspondingly, a remaining impairment share in the maximum impairment share of the second service 001 is 1.

If the processing platform determines that the remaining impairment share 1 of the second service 001 is not greater than a first incremental share 3 obtained by performing incremental processing on a first service A by using the second resource share that corresponds to the second service 001, the processing platform deducts a share the same as the remaining impairment share 1 from the incremental share.

Table 7 includes the second incremental data determined by the processing platform.

TABLE 7

| First service | Maximum appreciation share | Second service | Maximum return share | Incremental share |
|---|---|---|---|---|
| A | 3 | 001 | 7 | 3 |
| B | 5 | 001 | 7 | 4 |
| B | 5 | 002 | 18 | 1 |
| C | 10 | 002 | 18 | 10 |
| C | 10 | 002 | 10 | -3 |
| B | 5 | 001 | 5 | -4 |
| A | 3 | 001 | 7 | -1 |

For the transferred incremental share determined in step S330, step S340 includes: the processing platform sends a first transfer request including the transferred incremental data to the second service provider, so that the second service provider transfers a corresponding resource to a resource pool based on the transferred incremental data in the request.

Figure 3B:
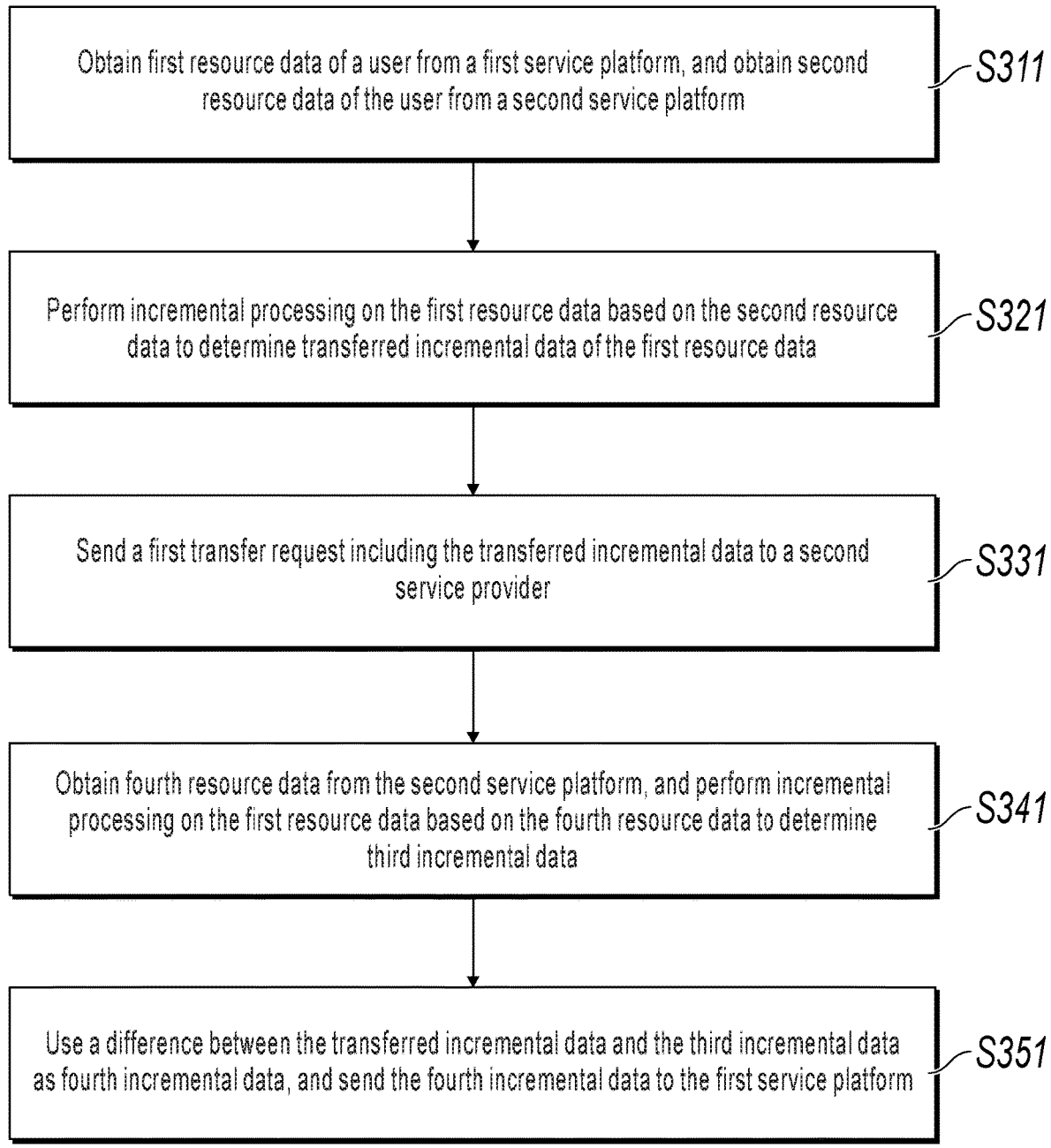
FIG. 3B is a flowchart illustrating yet another resource processing method, according to an implementation of the present disclosure.

FIG. 3B is a flowchart illustrating yet another resource processing method, according to an implementation of the present disclosure. In the method, a processing platform can obtain fourth resource data of a user. The fourth resource data is generated by returning some or all of the second service after the user confirms the second service. The method in this implementation includes the following steps.

Step S311: Obtain a user's first resource data from a first service platform, and obtain the user's second resource data from a second service platform. Step S321: Perform incremental processing on the first resource data based on the second resource data to determine transferred incremental data of the first resource data. The transferred incremental data includes a transferred incremental share and a reserved share. Step S331: Send a first transfer request including the transferred incremental data to a second service provider, so that the second service provider transfers a resource matching the transferred incremental data to a resource pool based on the transferred incremental data. It is worthwhile to note that step S311 can be performed based on step S210 or step S310. Step S321 can be performed based on step S220 or steps S320 and S330. Step S331 can be performed based on step S230 or step S340. For specific descriptions, refer to the descriptions of the steps in the earlier-described implementation of the present disclosure. Details are not described here again.

Step S341: The processing platform obtains fourth resource data of the user from the second service platform, and performs incremental processing on the first resource data based on the fourth resource data and the transferred incremental data to determine third incremental data.

The processing platform obtains the fourth resource data of the user from the second service platform. The resource data includes some or all of the second service returned after the user confirms the second service, and a fourth resource share. The processing platform obtains a second maximum impairment share that corresponds to the fourth resource data based on the fourth resource data. The processing platform determines whether the second maximum impairment share is greater than the reserved share. If the second maximum impairment share is not greater than the reserved share, the processing platform deducts a share the same as the second maximum impairment share from the second reserved share; or if the second maximum impairment share is greater than the reserved share, the processing platform deducts the second reserved share, and deducts a difference between the second maximum impairment share and the reserved share from the second incremental share.

For example, the processing platform obtains the fourth resource data from the second service platform. As shown in Table 8, the fourth resource data includes a second service 002 and a fourth resource share 600 that correspond to the second service 002.

TABLE 8

| Second service | Fourth resource share |
|---|---|
| 002 | 600 |

The processing platform obtains the second maximum impairment share that corresponds to the fourth resource data. The obtained maximum impairment share is a second maximum impairment share 6 that corresponds to the fourth resource share of the second service 002.

The transferred incremental data is shown in Table 7, and the reserved share in the transferred incremental data is 0.

If the processing platform determines that the second maximum impairment share 6 of the second service 002 is not greater than an incremental share 8 obtained by performing incremental processing on a first service C by using the fourth resource share that corresponds to the second service 002, the processing platform transfers a share the same as the second maximum impairment share 6 of the second service 002 from the transferred incremental share.

Table 8 includes the third incremental data determined by the processing platform.

TABLE 9

| First service | Maximum appreciation share | Second service | Maximum return share | Incremental share |
|---|---|---|---|---|
| A | 3 | 001 | 7 | 3 |
| B | 5 | 001 | 7 | 4 |
| B | 5 | 002 | 18 | 1 |

TABLE 9-continued

| First service | Maximum appreciation share | Second service | Maximum return share | Incremental share |
|---|---|---|---|---|
| C | 10 | 002 | 18 | 10 |
| C | 10 | 002 | 10 | −3 |
| B | 5 | 001 | 5 | −4 |
| A | 3 | 001 | 7 | −1 |
| C | 10 | 002 | 6 | −6 |

It is worthwhile to note that, for descriptions of step S341, refer to the descriptions of step S330.

Step S351: The processing platform uses a difference between the transferred incremental data and the third incremental data as fourth incremental data, and sends the fourth incremental data to the first service platform, so that the first service platform obtains a resource matching the fourth incremental data from the resource pool based on the fourth incremental data, and transfers the resource to the user.

Based on a specific application scenario, the implementation shown in FIG. 3 can be applied as follows:

A processing platform (for example, a set of open data processing services (ODPS) developed by the Alibaba Cloud based on cloud computing) obtains first resource data (for example, asset data obtained by purchasing a wealth investment product) of a user from a first service platform (for example, Ant Fortune platform), and obtains second resource data (for example, spending data obtained by purchasing merchandise) of the user from a second service platform (for example, Taobao or TMall Supermarket). The first resource data includes first resource data (for example, a name and an amount of a purchased AIP fund) obtained by the user by using a first service (for example, regular wealth investment), provided by a first service provider (for example, a securities firm). The second resource data includes second resource data (for example, a name and a payment amount of a purchased mobile phone) obtained by the user by using a second service (for example, mobile phone subscription), provided by a second service provider (for example, a Taobao seller).

The processing platform can include an offline synchronization tool (for example, DataX, independently developed by Alibaba). The processing platform can synchronize the first resource data on the first service platform, the second resource data on the second service platform and such to the processing platform by using the offline synchronization tool. For example, the processing platform can synchronize all the first resource data on the first service platform and all the second resource data on the second service platform to the processing platform at a specified moment every day (for example, at 6:00 am) by using the offline synchronization tool.

As shown in Table 10, the processing platform performs incremental processing on the first resource data (for example, purchasing a fund A with RMB 300, purchasing a fund B with RMB 500, and purchasing a fund C with RMB 1000) based on the second resource data (for example, purchasing a shirt with RMB 500, purchasing a hat with RMB 200, purchasing a pair of leather shoes with RMB 1000, purchasing a pair of trousers with RMB 600, and purchasing a scarf with RMB 200), to obtain first incremental data of the first resource data.

TABLE 10

| Fund | Maximum appreciation share | Merchandise | Maximum return share | Incremental share |
| --- | --- | --- | --- | --- |
| A | 3 | Shirt | 5 | 3 |
| B | 5 | Shirt | 5 | 2 |
| B | 5 | Hat | 2 | 2 |
| B | 5 | Leather shoes | 10 | 1 |
| C | 10 | Leather shoes | 10 | 9 |
| C | 10 | Trousers | 6 | 1 |
| Reserved share | | Trousers | 6 | 5 |
| | | Scarf | 2 | 2 |

The processing platform obtains third resource data (for example, returning a pair of leather shoes worth RMB 1000 and a shirt worth RMB 500) from the second service platform, and performs incremental processing on the first resource data based on the third resource data to obtain second incremental data. As shown in Table 11, the processing platform uses a difference between the first incremental data and the second incremental data as transferred incremental data of the first resource data.

TABLE 11

| Fund | Maximum appreciation share | Merchandise | Maximum return share | Incremental share |
| --- | --- | --- | --- | --- |
| A | 3 | Shirt | 5 | 3 |
| B | 5 | Shirt | 5 | 2 |
| B | 5 | Hat | 2 | 2 |
| B | 5 | Leather shoes | 10 | 1 |
| C | 10 | Leather shoes | 10 | 9 |
| C | 10 | Trousers | 6 | 1 |
| C | 10 | Leather shoes | 10 | −3 |
| B | 5 | Shirt | 5 | −4 |
| A | 3 | Shirt | 5 | −1 |

The processing platform sends a first transfer request including the transferred incremental data (for example, incremental shares 7, 1, and 2 that respectively correspond to the funds A, B, and C) to the second service provider (for example, a Taobao seller that the user purchases the hat and the trousers from), so that the second service provider transfers corresponding resources (for example, RMB 7, RMB 1, and RMB 2 that respectively correspond to the funds A, B, and C) to a resource pool (for example, a fund pool) based on the transferred incremental data in the request.

As shown in Table 12, the processing platform can further obtain fourth resource data (for example, returning a pair of trousers worth RMB 600) from the second service platform (for example, Taobao), and perform incremental processing on the first resource data based on the fourth resource data and the transferred incremental data to obtain third incremental data of the first resource data.

TABLE 12

| Fund | Maximum appreciation share | Merchandise | Maximum return share | Incremental share |
| --- | --- | --- | --- | --- |
| A | 3 | Shirt | 5 | 3 |
| B | 5 | Shirt | 5 | 2 |
| B | 5 | Hat | 2 | 2 |
| B | 5 | Leather shoes | 10 | 1 |
| C | 10 | Leather shoes | 10 | 9 |
| C | 10 | Trousers | 6 | 1 |
| C | 10 | Leather shoes | 10 | −3 |
| B | 5 | Shirt | 5 | −4 |
| A | 3 | Shirt | 5 | −1 |
| C | 10 | Trousers | 6 | −6 |

The processing platform sends the third incremental data (for example, an incremental share −6 that corresponds to the trousers) to the first service platform (for example, the Ant Fortune platform), so that the first service platform obtains a resource (for example, RMB 6) matching the incremental data from the resource pool (for example, the fund pool) based on the incremental data, and transfers the resource to the second service provider (for example, the Taobao seller that corresponds to the trousers).

The processing platform uses a difference between the transferred incremental data and the third incremental data as fourth incremental data (for example, incremental shares 2, 1, and 1 that respectively correspond to the funds A, B, and C), and sends the fourth incremental data to the first service platform, so that the first service platform obtains resources (for example, RMB 2, RMB 1, and RMB 1 that respectively correspond to the funds A, B, and C) matching the incremental data from the resource pool based on the incremental data, and transfers the resource to the user.

In the resource processing method provided in this implementation of the present disclosure, incremental processing is performed on the first resource data on the first service platform by using the second resource data on the second service platform to determine the transferred incremental data, so that the second service provider transfers the resource matching the transferred incremental data to the resource pool based on the transferred incremental data, and the first service platform transfers the resource to the user.

Based on spending data obtained by the user by purchasing merchandise from a merchant and refund data obtained from sales refund, when income of wealth investment data is increased by using spending data of the user and spending sales refund, income processing is performed on asset data obtained by the user by purchasing a wealth investment product from a wealth investment platform, to obtain income data, so that the merchant transfers a fund matching the income data to the fund pool based on the income data. In addition, income processing can be performed on the asset data again by using refund data obtained from post-sales refund of the user, to obtain corresponding income data, so that the merchant obtains a fund matching the corresponding income data from the fund pool. When receiving assets obtained by cashing the wealth investment product from the wealth investment platform, the user can obtain not only a principal for purchasing the wealth investment product and basic income specified in a contract of the wealth investment product, but also fund income matching income data obtained from user's spending. As such, income obtained by the user by purchasing the wealth investment product can be increased through user's spending.

Figure 4:
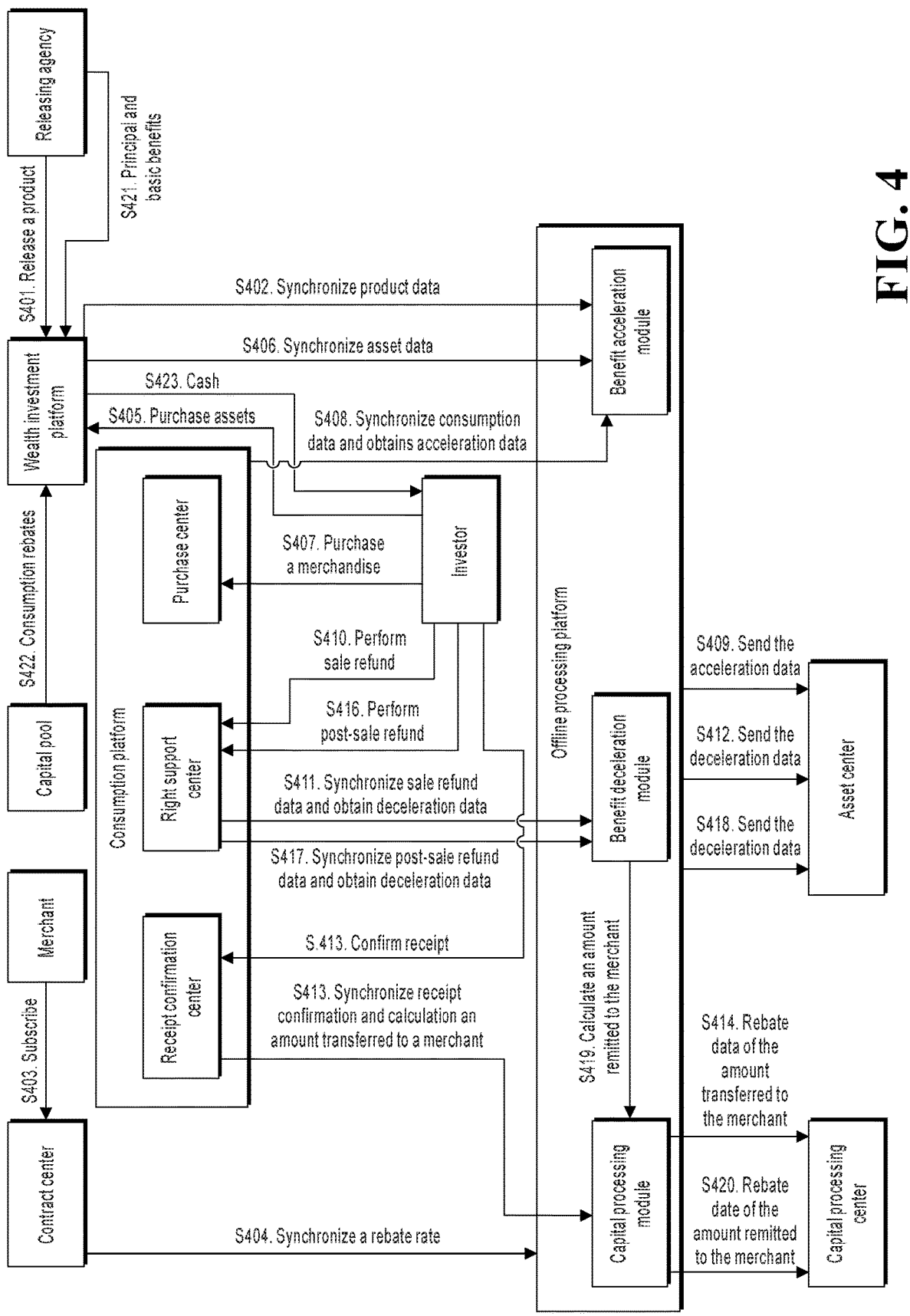
FIG. 4 is a flowchart illustrating a wealth investment income processing method, according to an implementation of the present disclosure.

FIG. 4 is a flowchart illustrating a wealth investment income processing method, according to an implementation of the present disclosure. The method can be performed by a plurality of devices. The device can be a device having a processing capability, such as a server, a system, an apparatus, or a platform. For example, the method can be performed by the processing platform, the first service platform, and the second service platform shown in FIG. 1. The processing platform, the first service platform, and the second service platform can be respectively an offline processing platform, a wealth investment platform, and a spending platform shown in FIG. 4.

In FIG. 4, the spending platform includes a receipt confirmation center, a right support center, and a purchase center. The offline processing platform includes a fund processing module, an income deceleration module, and an income acceleration module. As shown in FIG. 4, the method includes the following steps.

Step S401: The wealth investment platform receives product releasing information sent by a releasing agency.

Step S402: The offline processing platform synchronizes product data on the wealth investment platform to the offline processing platform by using an offline synchronization tool.

Step S403: A contract center receives subscription data of a merchant, and the subscription data includes a rebate rate specified by the merchant for each merchandise category.

Step S404: The offline processing platform synchronizes the rebate rate of each merchandise category in the contract center to the offline processing platform by using the offline synchronization tool.

Step S405: The wealth investment platform receives asset data obtained by an investor by purchasing a wealth investment product.

Step S406: The offline processing platform synchronizes the asset data to the offline processing platform by using the offline synchronization tool.

Step S407: The spending platform receives spending data obtained by the investor by purchasing merchandise.

Step S408: The offline processing platform synchronizes the spending data to the offline processing platform by using the offline synchronization tool, and the income acceleration module in the offline processing platform performs, based on the spending data obtained by the investor by purchasing the merchandise, income processing on the asset data obtained by the investor by purchasing the wealth investment product, to obtain income acceleration data. For example, the income acceleration module performs income processing on the asset data based on a programming model (MapReduce) for big data parallel computing. In a Map phase, all data of one user is clustered. In a Reduce phase, income acceleration processing is performed on all the data of the user to obtain income acceleration data.

Step S409: The offline processing platform sends the income acceleration data to an asset center, and the asset center can display the income acceleration data to the investor.

Step S410: The right support center in the spending platform receives sales refund data of the investor.

Step S411: The offline processing platform synchronizes the sales refund data to the offline processing platform by using the offline synchronization tool, and the income deceleration module in the offline processing platform performs, based on the income acceleration data and the sales refund data obtained by the investor by returning the merchandise, income processing on the asset data obtained by the investor by purchasing the wealth investment product, to obtain income deceleration data.

Step S412: The offline processing platform sends the income deceleration data to the asset center, and the asset center can display the income deceleration data to the investor.

Step S413: The receipt confirmation center in the spending platform receives a receipt confirmation message sent by the investor.

Step S414: The offline processing platform synchronizes receipt confirmation data to the offline processing platform by using the offline synchronization tool, and the fund processing module in the offline processing platform calculates an amount that the merchant needs to transfer to a fund pool.

Step S415: The offline processing platform synchronizes, to a fund processing center (finassetcore) by using the offline synchronization tool, the calculated amount that the merchant needs to transfer to the fund pool, so that the fund processing center triggers the merchant to transfer the amount to the fund pool.

Step S416: The right support center in the spending platform receives post-sales refund data of the investor.

Step S417: The offline processing platform synchronizes the post-sales refund data to the offline processing platform by using the offline synchronization tool, and the income deceleration module in the offline processing platform performs, based on the income acceleration data and the income deceleration data in the earlier-described steps and the post-sales refund data obtained by the investor by returning the merchandise, income processing on the asset data obtained by the investor by purchasing the wealth investment product, to obtain income deceleration data.

Step S418: The offline processing platform sends the income deceleration data to the asset center, and the asset center can display the income deceleration data to the investor.

Step S419: The fund processing module in the offline processing platform calculates an amount that the fund pool needs to remit to the merchant.

Step S420: The offline processing platform synchronizes, to the fund processing center by using the offline synchronization tool, the calculated amount that the fund pool needs to remit to the merchant, so that the fund processing center triggers the fund pool to remit the amount to the merchant.

Step S421: When cashing assets for the investor, the releasing agency sends the principal and basic income based on investor's purchase to the wealth investment platform.

Step S422: The wealth investment platform obtains corresponding spending rebates from the fund pool based on income data of the investor in the asset center.

Step S423: The wealth investment platform cashes the principal, the basic income, and the spending rebates for the investor.

Figure 5:
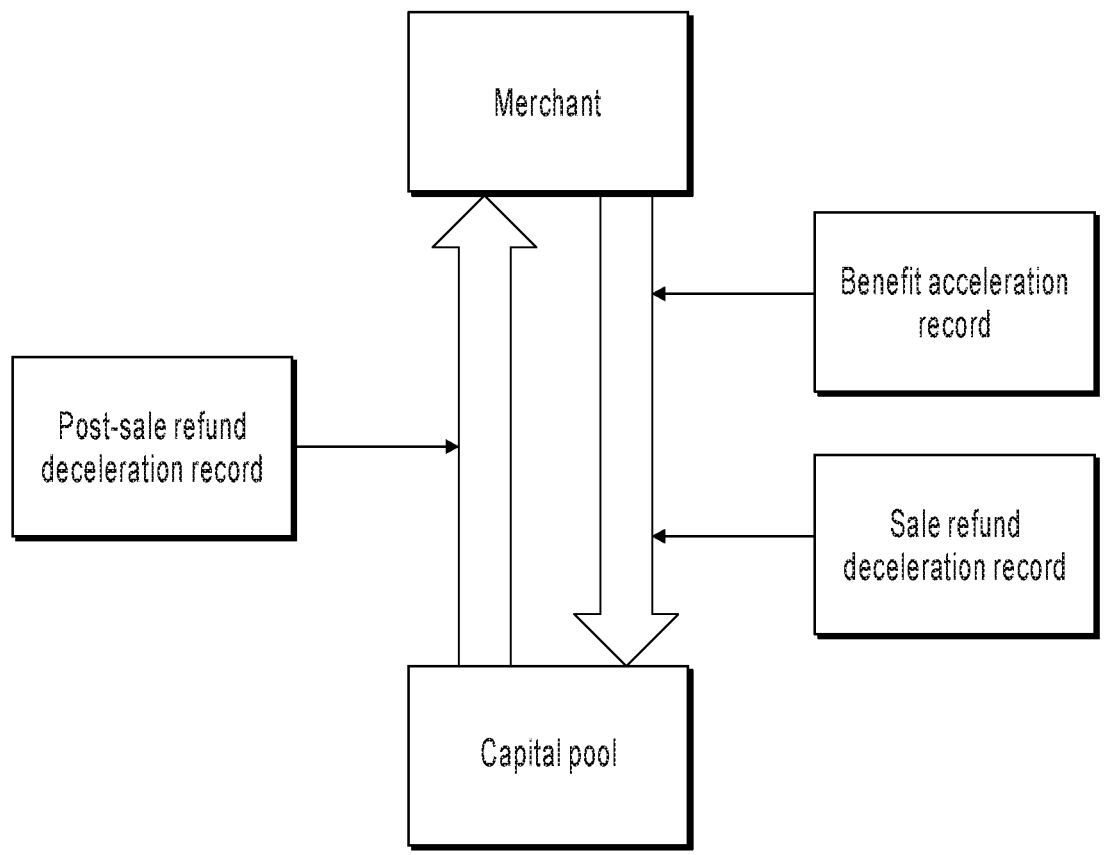
FIG. 5 is a diagram illustrating fund interaction between a merchant and a fund pool, according to an implementation of the present disclosure.

In this implementation of the present disclosure, a spending period can include four phases: purchase payment, sales refund, receipt confirmation, and post-sales refund. Fund exchange between the merchant and the fund pool in the four phases is shown in FIG. 5. The user confirms receipt to trigger the merchant to transfer an amount to the fund pool. An actual transferred amount is obtained based on the difference between an acceleration amount obtained by the user by purchasing merchandise and a deceleration amount obtained from sales refund. The user performs post-sales refund to trigger the fund pool to remit an amount to the merchant. An actual remitted amount is obtained based on a deceleration amount obtained from post-sales refund. For example, the user confirms receipt for a spending list 002 on D day, and performs post-sales refund on (D+1) day. An accumulated acceleration amount of an income acceleration amount and an income deceleration amount generated by the spending list 002 on D day is RMB 8, and the fund center needs to trigger the merchant to transfer RMB 8 to the fund pool. The spending list 002 generates a post-sale deceleration amount of RMB 6 on (D+1) day, and the fund center needs to trigger the fund pool to remit RMB 6 to the merchant.

In the wealth investment income processing method provided in this implementation of the present disclosure, by using the spending data obtained from the user's merchandise purchase from the merchant and refund data obtained from the sales refund, income processing can be performed on the asset data obtained from user's wealth investment product purchase from the wealth investment platform. Income data is then obtained so that the merchant can transfer a fund that matches the income data to the fund pool based on the income data. In addition, income processing can be performed on the asset data again by using refund data obtained from post-sales refund of the user to obtain corresponding income data, so that the merchant obtains a fund matching the corresponding income data from the fund pool. When receiving assets obtained by cashing the wealth investment product from the wealth investment platform, the user can obtain not only the principal for purchasing the wealth investment product and the basic income specified in a contract of the wealth investment product, but also fund income matching income data obtained from user's spending. As such, income obtained by the user by purchasing the wealth investment product can be increased through user's spending.

An implementation of the present disclosure provides a service platform resource processing method. The method includes: receiving a user's transferred incremental data sent by a processing platform, where the transferred incremental data is determined by the processing platform based on resource data of the user on another service platform; obtaining a resource matching the transferred incremental data from a resource pool based on the transferred incremental data, where the resource is transferred by the another service platform to the resource pool based on the transferred incremental data; and transferring the resource to the user.

Figure 6:
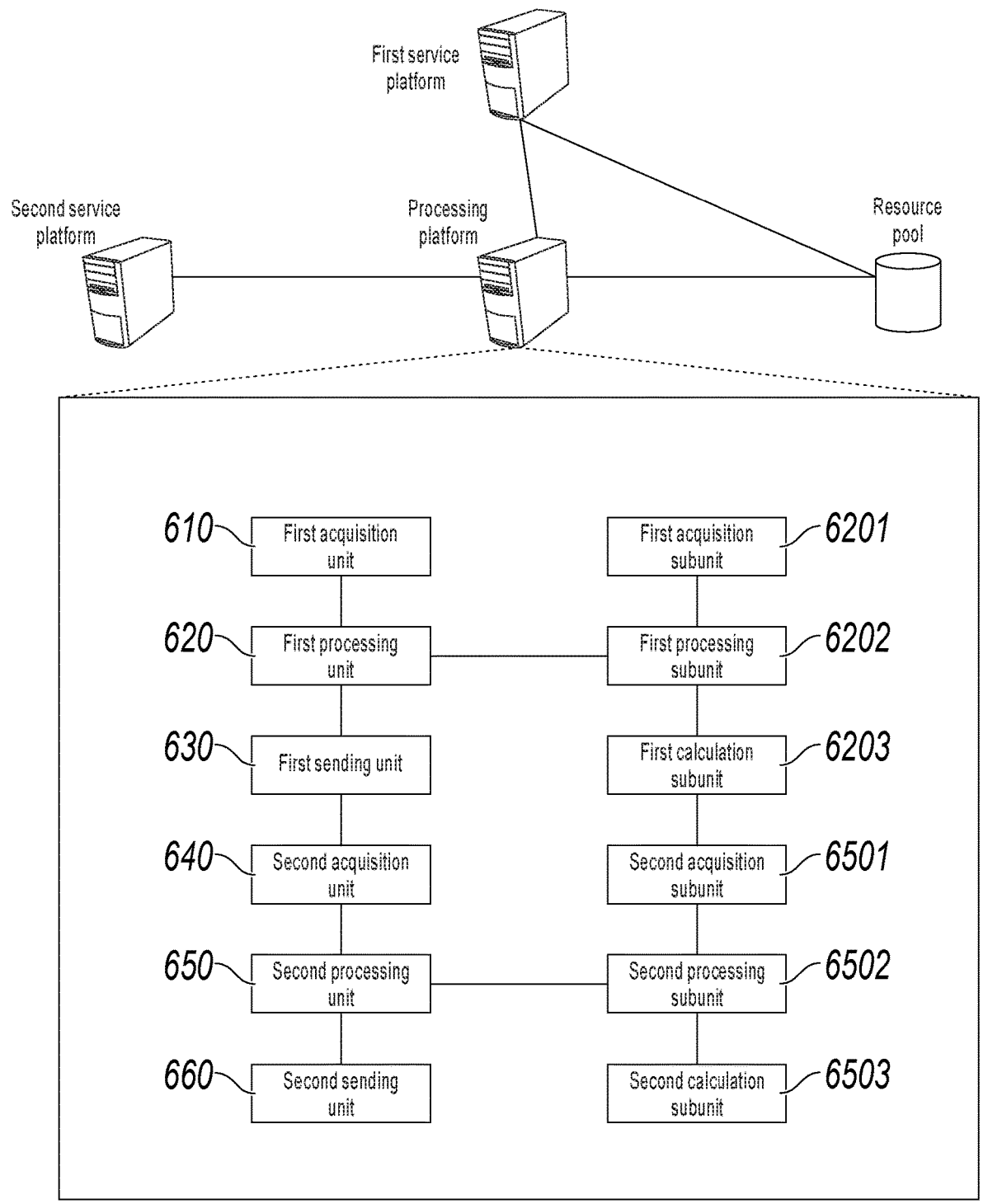
FIG. 6 is a schematic diagram illustrating a resource processing apparatus, according to an implementation of the present disclosure.

Corresponding to the resource processing method, more than one implementations of the present disclosure further provide a resource processing apparatus. As shown in FIG. 6, the apparatus includes: a first acquisition unit 610, configured to: obtain a user's first resource data from a first service platform, and obtain the user's second resource data from a second service platform, where the first resource data is generated by the user by using a first service, provided by a first service provider on the first service platform, and the second resource data is generated by the user by using a second service, provided by a second service provider on the second service platform; a first processing unit 620, configured to perform incremental processing on the first resource data based on at least the second resource data to determine transferred incremental data of the first resource data; and a first sending unit 630, configured to send a first transfer request including the transferred incremental data to the second service provider, so that the second service provider transfers a resource matching the transferred incremental data to a resource pool based on the transferred incremental data.

In a possible design, the first processing unit 620 includes: a first acquisition subunit 6201, configured to: obtain maximum appreciation data that corresponds to the first resource data based on the first resource data, and obtain maximum return data that corresponds to the second resource data based on the second resource data; and a first processing subunit 6202, configured to perform incremental processing on the first resource data based on the maximum appreciation data and the maximum return data to determine the transferred incremental data of the first resource data.

In a possible design, the maximum appreciation data obtained by the first acquisition subunit 6201 includes the first service and a maximum appreciation share that corresponds to the first service, the maximum return data obtained by the first acquisition subunit 6201 includes the second service and a maximum return share that corresponds to the second service, and the transferred incremental data determined by the first processing subunit 6202 includes the first service, the second service, and a transferred incremental share.

The first processing subunit 6202 is configured to determine whether the maximum return share is greater than the maximum appreciation share; and if the maximum return share is not greater than the maximum appreciation share, use the maximum return share as the transferred incremental share; or if the maximum return share is greater than the maximum appreciation share, use the maximum appreciation share as the transferred incremental share, obtain a difference between the maximum return share and the maximum appreciation share, and use the difference as a reserved share, where a share is transferred from the reserved share when the user returns the second service.

In a possible design, the first acquisition unit 610 is further configured to obtain third resource data of the user from the second service platform, where the third resource data is generated by returning some or all of the second service before the user confirms the second service.

The processing unit includes: a first processing subunit 6202 that is configured to determine first incremental data of the first resource data based on at least the second resource data, and perform incremental processing on the first resource data based on at least the third resource data and the first incremental data to determine second incremental data of the first resource data; and a first calculation subunit 6203, configured to use a difference between the first incremental data and the second incremental data as the transferred incremental data.

In a possible design, the first processing unit 620 further includes: a first acquisition subunit 6201, configured to: obtain maximum appreciation data that corresponds to the first resource data, obtain maximum return data that corresponds to the second resource data, determine a first incremental share and a reserved share based on the maximum appreciation data and the maximum return data, and obtain a first maximum impairment share that corresponds to the third resource data based on the third resource data.

The first processing subunit 6202 is configured to: determine whether the first maximum impairment share is greater than the reserved share; and if the first maximum impairment share is not greater than the reserved share, deduct a share the same as the first maximum impairment share from the reserved share, and use a difference between the reserved share and the first maximum impairment share as an updated reserved share; or if the first maximum impairment share is greater than the reserved share, deduct the reserved share, transfer a difference between the first maximum impairment share and the reserved share from the first incremental share, and use a difference between the first incremental share and the difference as a second incremental share.

In a possible design, the first sending unit is further configured to send the transferred incremental data to the first service platform, so that the first service platform obtains the resource matching the transferred incremental data from the resource pool, and transfers the resource to the user.

In a possible design, the apparatus further includes: a second acquisition unit 640, configured to obtain fourth resource data of the user from the second service platform, where the fourth resource data is generated by returning some or all of the second service after the user confirms the second service; a second processing unit 650, configured to: perform incremental processing on the first resource data based on at least the fourth resource data and the transferred incremental data to determine third incremental data of the first resource data; and a second sending unit 660, configured to send a second transfer request including the third incremental data to the second service provider, so that the second service provider obtains a resource matching the third incremental data from the resource pool based on the third incremental data.

In a possible design, the second processing unit 650 includes: a second acquisition subunit 6501, configured to: obtain maximum appreciation data that corresponds to the first resource data, obtain maximum return data that corresponds to the second resource data, and determine a transferred incremental share and a reserved share based on the maximum appreciation data and the maximum return data; and obtain a second maximum impairment share that corresponds to the fourth resource data based on the fourth resource data; and a second processing subunit 6502, configured to: determine whether the second maximum impairment share is greater than the reserved share; and if the second maximum impairment share is not greater than the reserved share, deduct a share the same as the second maximum impairment share from the reserved share; or if the second maximum impairment share is greater than the reserved share, deduct the reserved share, and deduct a difference between the second maximum impairment share and the reserved share from the second incremental share.

In a possible design, the second processing unit 650 further includes a second calculation subunit, configured to use a difference between the transferred incremental data and the third incremental data as fourth incremental data.

The second sending unit 660 is further configured to send the fourth incremental data to the first service platform, so that the first service platform obtains a resource matching the fourth incremental data from the resource pool based on the fourth incremental data, and transfers the resource to the user.

Functions of functional modules of the apparatus in this implementation of the present disclosure can be implemented by performing the steps in the previous method implementation. A specific working process of the apparatus provided in the present disclosure is not described here.

In the resource processing apparatus provided in this implementation of the present disclosure, the first obtaining module 610 obtains the first resource data from the first service platform, and obtains the second resource data from the second service platform, and the first processing module 620 performs incremental processing on the first resource data on the first service platform by using the first resource data to determine the transferred incremental data, so that the second service provider transfers the resource matching the transferred incremental data to the resource pool based on the transferred incremental data, and the first service platform transfers the resource to the user. This method can increase income of wealth investment data based on spending data of the user, so that the user can obtain additional wealth investment income.

Figure 7:
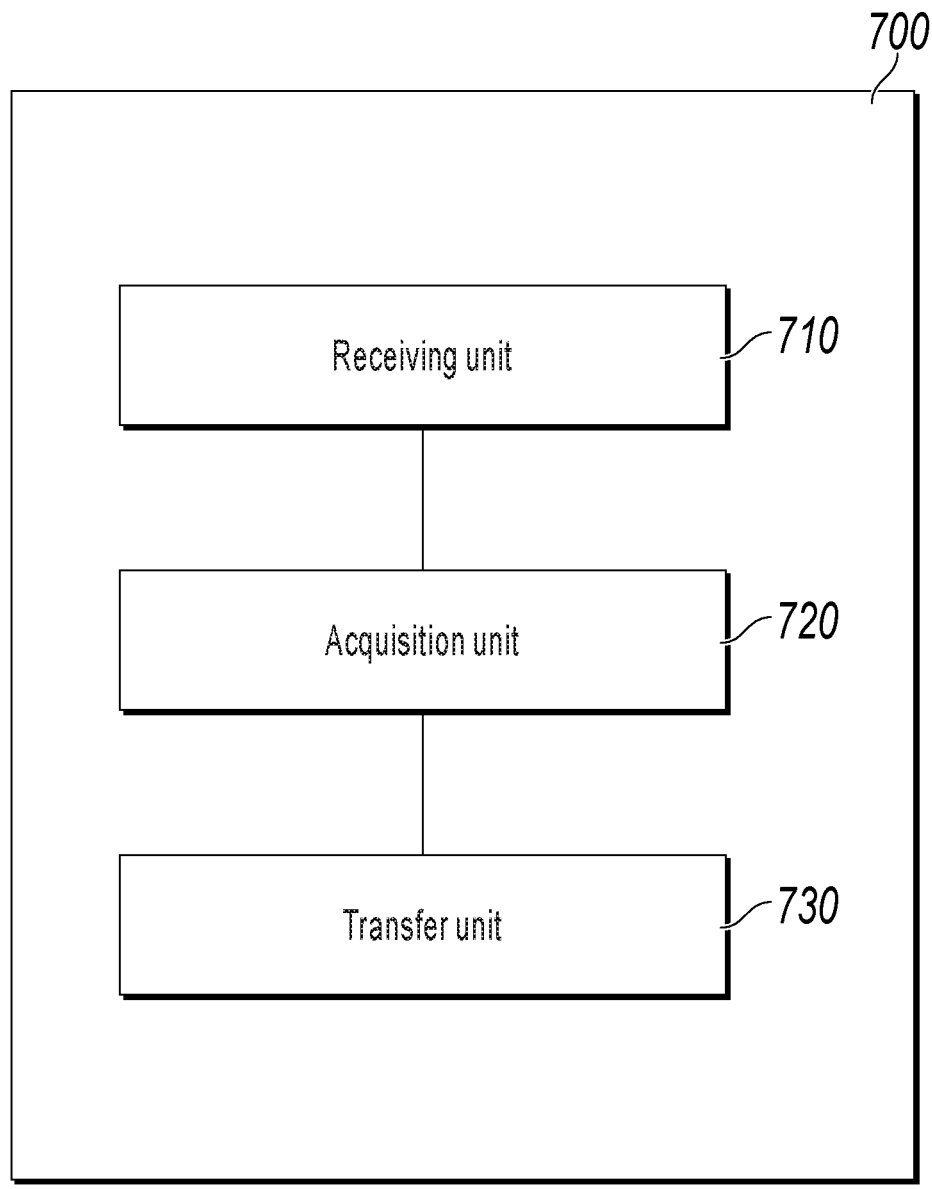
FIG. 7 is a schematic diagram illustrating a service platform resource processing apparatus, according to an implementation of the present disclosure.

Corresponding to the service platform resource processing method, a plurality of implementations of the present disclosure further provide a service platform resource processing apparatus. As shown in FIG. 7, the apparatus 700 includes: a receiving unit 710, configured to receive a user's transferred incremental data sent by a processing platform, where the transferred incremental data is determined by the processing platform based on resource data of the user on another service platform; an acquisition unit 720, configured to obtain a resource matching the transferred incremental data from a resource pool based on the transferred incremental data, where the resource is transferred by the another service platform to the resource pool based on the transferred incremental data; and a transfer unit 730, configured to transfer the resource to the user.

A person skilled in the art should be aware that in the earlier-described one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium.

The objectives, technical solutions, and income of the present disclosure are further described in detail in the earlier-described specific implementations. It should be understood that the earlier-described descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

Figure 8:
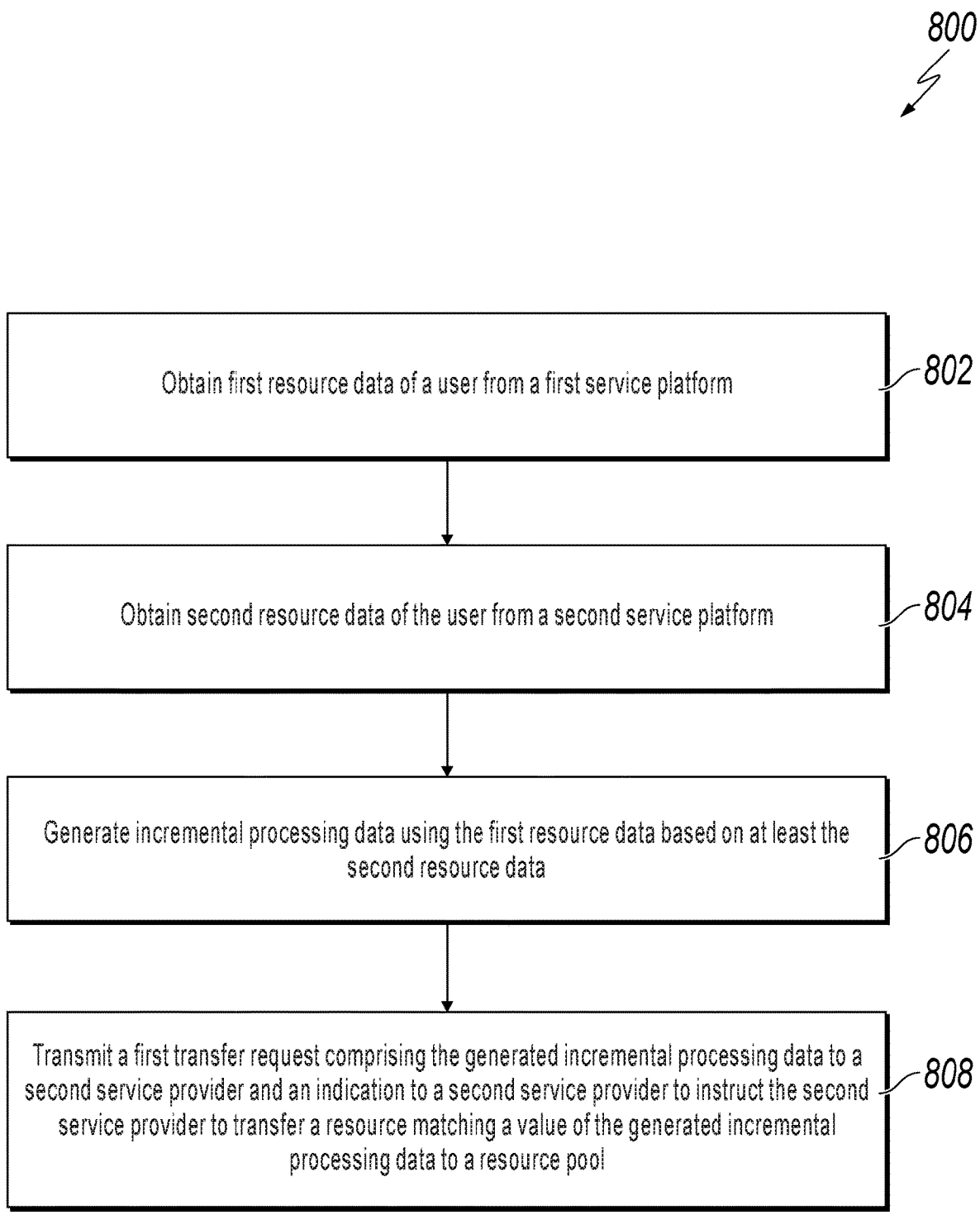
FIG. 8 is a flowchart illustrating an example of a computer-implemented method for a resource processing method, according to an implementation of the present disclosure.

FIG. 8 is a flowchart illustrating an example of a computer-implemented method 800 for a resource processing method, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a processing platform obtains first resource data of a user from a first service platform. Specifically, the processing platform obtains the first resource data by the user using a first service communicating with a first service provider on the first service platform. The first resource data can the first service and a first resource share. For example, the processing platform, which can be a cloud computing database, can obtain financial data purchased by a user from a wealth investment product from a first service platform, such as an Ant Fortune platform or another platform, such as MINT. In addition, the first resource data can include data such as a name of the user and a shareholder amount purchased of a stock fund by using a first service, a wealth investment company, for example, provided by a first service provider, a securities firm, for example. From 802, method 800 proceeds to 804.

At 804, the processing platform obtains second resource data of the user from a second service platform. Specifically the processing platform obtains the second resource data by the user using a second service communicating with a second service provider on the second service platform. The second resource data includes the second service and a second resource share. Continuing with the example from above, the processing platform can obtain a user's spending data from purchasing one or more products from a second service platform, such as Taobao or AMAZON. In addition, the second resource data can include data such as a name of a user and a payment amount of a purchased vehicle obtained by the user by using a second service (such as a car dealership), provided by a second service provider (such as an AMAZON seller). From 804, method 800 proceeds to 806.

At 806, the processing platform generates incremental processing data using the first resource data based on at least the second resource data. The processing platform performs an incremental processing procedure on the user's first resource data based on the obtained the user's second resource data to generate the incremental processing data. In particular, the processing platform obtains maximum appreciation data that corresponds to the first resource data and obtains maximum return data that corresponds to the second resource data. The processing platform performs incremental processing on the first resource data using the maximum appreciation data and the maximum return data to determine the incremental processing data.

In comparing the maximum appreciation data and the maximum return data, the processing platform determines whether the maximum return data is greater than the maximum appreciation data. If the maximum appreciation data is greater than the maximum return data, then the processing platform uses the maximum return data as the transferred incremental processing data. If the maximum return data is greater than the maximum appreciation data, then the processing platform uses the maximum appreciation data as the transferred incremental processing data. The processing platform then determines a difference between the maximum return data and the maximum appreciation data, and the processing platform uses the difference as a reserved share. Once the user returns the goods of the second service, the processing platform transfers a share from the reserved share.

In other implementations, the processing platform determines third resource data from the second service platform. The processing platform performs incremental processing on the first resource data based on the third resource data to obtain second incremental data of the first resource data, and the processing platform uses the difference between the first incremental data and the second incremental data as the transferred processing incremental data. From 806, method 800 proceeds to 808.

At 808, the processing platform transmits a first transfer request that includes the generated incremental processing data to a second service provider and an indication to a second service provider to instruct the second service provider to transfer a resource matching a value of the generated incremental processing data to a resource pool. The processing platform additionally transfers the first request to the first service platform, so that the first service platform obtains the resource matching the value of the generated incremental processing data from the resource pool. In addition, the processing platform can then transfer the resource from the first service platform to the user. After 808, method 800 stops.

The features of the present application seek to obtain resource transfer by obtaining and processing resource data from a service platform. For example, the system seeks to obtaining first resource data of a user from a first service platform; obtaining second resource data of the user from a second service platform; generating incremental processing data using the first resource data based on at least the second resource data; and transmitting a first transfer request comprising the generated incremental processing data to a second service provider and an indication to a second service provider to instruct the second service provider to transfer a resource matching a value of the generated incremental processing data to a resource pool. By performing this method, the income of wealth investment for a user can be increased by analyzing spending data of the user, so that the user can obtain additional wealth investment income.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    obtaining investment data of a user from a wealth investment platform;
    determining, using the investment data, appreciation data indicating an amount by which one or more of the user's investments are expected to appreciate;
    obtaining merchandise purchase data of the user from a spending platform;
    obtaining a rebate rate for a merchandise category corresponding to the merchandise purchase data;
    calculating refund data based on at least the investment data, the appreciation data, the rebate rate, and the merchandise purchase data;
    transmitting a first transfer request comprising the calculated refund data and an indication to a merchant on the spending platform to instruct the merchant to transfer a resource matching a value of the calculated refund data to a resource pool; and
    transferring the resource from the resource pool to the wealth investment platform to adjust a wealth investment income of the user based on the merchandise purchase data,
    wherein the wealth investment platform and the spending platform comprise respective sets of one or more networked computers.

2. The computer-implemented method of claim 1, wherein obtaining investment data comprises synchronizing the investment data between the wealth investment platform and an offline processing center,
    wherein obtaining merchandise data comprises synchronizing the merchandise purchase data between the spending platform and the offline processing center,
    wherein obtaining a rebate rate comprises synchronizing the rebate rate between a contract center and the offline processing center, the contract center having subscription data of the merchant, the subscription data comprising a plurality of rebate rates, each rebate rate corresponding to a respective merchandise category, and
    wherein calculating refund data comprises calculating the refund data at the offline processing center.

3. The computer-implemented method of claim 1, wherein calculating refund data comprises
    clustering data corresponding to the user from a set of asset data, and
    performing income acceleration processing on the clustered data corresponding to the user.

4. The computer-implemented method of claim 1, wherein calculating the refund data further comprises:
    calculating a maximum appreciation data corresponding to the investment data by multiplying an appreciation rate by an investment share of the user;

calculating a maximum return data corresponding to the merchandise purchase data by multiplying a return rate by a merchandise purchase amount of the user; and determining a reserved share as a difference between the maximum appreciation data and the maximum return data.

5. The computer-implemented method of claim 4, further comprising in response to receiving an indication that the user has returned merchandise corresponding to the merchandise purchase data, transmitting a second transfer request comprising the reserved share and an indication to the user to instruct the user to transfer a resource matching a value of the reserved share to the merchant.

6. The computer-implemented method of claim 4, further comprising:

comparing the maximum appreciation data to the maximum return data; and in response to determining the maximum appreciation data is greater than the maximum return data, identifying the refund data as the maximum return data.

7. The computer-implemented method of claim 4, further comprising:

comparing the maximum appreciation data to the maximum return data; and in response to determining that the maximum return data is greater than the maximum return data, identifying the refund data as the maximum appreciation data.

8. The computer-implemented method of claim 1, wherein transmitting the first transfer request is in response to receiving a receipt confirmation message sent by the user.

9. The computer-implemented method of claim 1, wherein the investment data is a first investment data, the rebate rate is a first rebate rate, and the merchandise purchase data is a first merchandise purchase data, and further comprising:

obtaining a plurality of other investment data of the user;

obtaining a plurality of other merchandise purchase data of the user;

calculating, in a particular order, a plurality of other refund data, each other refund data based on at least a portion of the first and other investment data and at least a portion of the first and other merchandise purchase data; and transferring a plurality of resources, each resource matching a value of a respective refund data of the plurality of refund data, to the resource pool in an order opposite the particular order of calculating the plurality of refund data.

10. A non-transitory, computer-readable medium storing one or more instructions executable by a computer system to perform operations comprising:

obtaining investment data first resource data of a user from a wealth investment platform;

determining, using the investment data, appreciation data indicating an amount by which one or more of the user's investments are expected to appreciate;

obtaining merchandise purchase data of the user from a spending platform;

obtaining a rebate rate for a merchandise category corresponding to the merchandise purchase data;

calculating refund data based on at least the investment data, the appreciation data, the rebate rate, and the merchandise purchase data;

transmitting a first transfer request comprising the calculated refund data and an indication to a merchant on the spending platform to instruct the merchant to transfer a resource matching a value of the calculated refund data to a resource pool; and transferring the resource from the resource pool to the wealth investment platform to adjust a wealth investment income of the user based on the merchandise purchase data, wherein the wealth investment platform and the spending platform comprise respective sets of one or more networked computers.

11. The non-transitory, computer-readable medium of claim 10, wherein obtaining investment data comprises synchronizing the investment data between the wealth investment platform and an offline processing center, wherein obtaining merchandise data comprises synchronizing the merchandise purchase data between the spending platform and the offline processing center, wherein obtaining a rebate rate comprises synchronizing the rebate rate between subscription data of the merchant, the subscription data comprising a plurality of rebate rates, each rebate rate corresponding to a respective merchandise category, and wherein calculating refund data comprises calculating the refund data at the offline processing center.

12. The non-transitory, computer-readable medium of claim 10, wherein calculating refund data comprises clustering data corresponding to the user from a set of asset data, and performing income acceleration processing on the clustered data corresponding to the user.

13. The non-transitory, computer-readable medium of claim 10, wherein calculating the refund data further comprises:

calculating a maximum appreciation data corresponding to the investment data by multiplying an appreciation rate by an investment share of the user;

calculating a maximum return data corresponding to the merchandise purchase data by multiplying a return rate by a merchandise purchase amount of the user; and determining a reserved share as a difference between the maximum appreciation data and the maximum return data.

14. The non-transitory, computer-readable medium of claim 13, further comprising in response to receiving an indication that the user has returned merchandise corresponding to the merchandise purchase data, transmitting a second transfer request comprising the reserved share and an indication to the user to instruct the user to transfer a resource matching a value of the reserved share to the merchant.

15. The non-transitory, computer-readable medium of claim 13, further comprising:

comparing the maximum appreciation data to the maximum return data; and in response to determining the maximum appreciation data is greater than the maximum return data, identifying the refund data as the maximum return data.

16. The non-transitory, computer-readable medium of claim 13, further comprising:

comparing the maximum appreciation data to the maximum return data; and in response to determining that the maximum return data is greater than the maximum appreciation data, identifying the generated refund data as the maximum appreciation data.

17. The non-transitory, computer-readable medium of claim 10, wherein transmitting the first transfer request is in response to receiving a receipt confirmation message sent by the user.

18. The non-transitory, computer-readable medium of claim 10, wherein the investment data is a first investment data, the rebate rate is a first rebate rate, and the merchandise purchase data is a first merchandise purchase data, and further comprising:
obtaining a plurality of other investment data of the user;
obtaining a plurality of other merchandise purchase data of the user;
calculating, in a particular order, a plurality of other refund data, each other refund data based on at least a portion of the first and other investment data and at least a portion of the first and other merchandise purchase data; and
transferring a plurality of resources, each resource matching a value of a respective refund data of the plurality of refund data, to the resource pool in an order opposite the particular order of calculating the plurality of refund data.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining investment data of a user from a wealth investment platform;
determining, using the investment data, appreciation data indicating an amount by which one or more of the user's investments are expected to appreciate;
obtaining merchandise purchase data of the user from a spending platform;
obtaining a rebate rate for a merchandise category corresponding to the merchandise purchase data;
calculating refund data based on at least the investment data, the appreciation data, the rebate rate, and the merchandise purchase data;
transmitting a first transfer request comprising the generated refund data and an indication to a merchant on the spending platform to instruct the merchant to transfer a resource matching a value of the generated refund data to a resource pool; and
transferring the resource from the resource pool to the wealth investment platform to adjust a wealth investment income of the user based on the merchandise purchase data,
wherein the wealth investment platform and the spending platform comprise respective sets of one or more networked computers.

20. The computer-implemented system of claim 19, wherein obtaining investment data comprises synchronizing the investment data between the wealth investment platform and an offline processing center,
wherein obtaining merchandise data comprises synchronizing the merchandise purchase data between the spending platform and the offline processing center,
wherein obtaining a rebate rate comprises synchronizing the rebate rate between a contract center and the offline processing center, the contract center having subscription data of the merchant, the subscription data comprising a plurality of rebate rates, each rebate rate corresponding to a respective merchandise category, and
wherein calculating refund data comprises calculating the refund data at the offline processing center.

21. The computer-implemented system of claim 19, wherein calculating the refund data further comprises:
obtaining calculating a maximum appreciation data corresponding to the investment data by multiplying an appreciation rate by an investment share of the user;
calculating a maximum return data corresponding to the merchandise purchase data by multiplying a return rate by a merchandise purchase amount of the user; and
determining a reserved share as a difference between the maximum appreciation data and the maximum return data.

22. The computer-implemented system of claim 19, further comprising:
comparing the maximum appreciation data to the maximum return data; and
in response to determining the maximum appreciation data is greater than the maximum return data, identifying the refund data as the maximum return data.

23. The computer-implemented system of claim 21, further comprising
in response to receiving an indication that the user has returned merchandise corresponding to the merchandise purchase data, transmitting a second transfer request comprising the reserved share and an indication to the user to instruct the user to transfer a resource matching a value of the reserved share to the merchant.

* * * * *

UNITED STATES PATENT AND TRADEMARK OFFICE
CERTIFICATE OF CORRECTION

PATENT NO. : 10,645,021 B2
APPLICATION NO. : 16/124580
DATED : May 5, 2020
INVENTOR(S) : Yuzhong Wang Page 1 of 1

It is certified that error appears in the above-identified patent and that said Letters Patent is hereby corrected as shown below:

In the Claims

In Column 25, Line 28, in Claim 7, delete "return" and insert -- appreciation --, therefor.

In Column 25, Line 54, in Claim 10, after "data" delete "first resource data".

In Column 26, Line 20, in Claim 11, after "between" insert -- a contract center and the offline processing center, the contract center having --.

In Column 28, Line 25, in Claim 21, before "calculating" delete "obtaining".

Signed and Sealed this
Sixth Day of October, 2020

Andrei Iancu
*Director of the United States Patent and Trademark Office*